(12) United States Patent
Samie et al.

(10) Patent No.: US 8,083,042 B2
(45) Date of Patent: Dec. 27, 2011

(54) SELECTABLE ONE-WAY CLUTCH WITH SYMMETRICAL STRUTS

(75) Inventors: Farzad Samie, Franklin, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1053 days.

(21) Appl. No.: 11/952,248

(22) Filed: Dec. 7, 2007

(65) Prior Publication Data
US 2008/0169165 A1 Jul. 17, 2008

Related U.S. Application Data

(60) Provisional application No. 60/884,700, filed on Jan. 12, 2007.

(51) Int. Cl.
*F16D 11/06* (2006.01)
(52) U.S. Cl. ........... 192/43.1; 192/46; 192/47; 192/69.1
(58) Field of Classification Search ............... 192/43, 192/43.1, 69.1
See application file for complete search history.

(56) References Cited

U.S. PATENT DOCUMENTS

| | | |
|---|---|---|
| 1,406,211 A | 2/1922 | Meyers |
| 3,256,966 A | 6/1966 | Anquist |
| 3,467,231 A | 9/1969 | Haznar |
| 5,927,455 A | 7/1999 | Baker et al. |
| 6,244,965 B1 * | 6/2001 | Klecker et al. ................. 464/81 |
| 7,258,214 B2 * | 8/2007 | Pawley et al. ................ 192/43.1 |

FOREIGN PATENT DOCUMENTS

| | | |
|---|---|---|
| AU | 451829 B2 | 8/1974 |
| DE | 104971 C | 8/1899 |
| FR | 2122059 A5 | 8/1972 |
| GB | 104447 A | 3/1917 |

OTHER PUBLICATIONS

Search Report, European Patent Office, Jan. 10, 2011.

* cited by examiner

*Primary Examiner* — David D Le
*Assistant Examiner* — Ryan Dodd
(74) *Attorney, Agent, or Firm* — Quinn Law Group, PLLC

(57) ABSTRACT

A selectable one-way clutch (SOWC) is provided for use with a vehicle transmission, and has a first race with a plurality of strut pockets, a moveable selector plate, symmetrical torque-holding elements or struts, and a second race that is rotatably engageable with a torque input device. The selector plate has a plurality of windows, and the struts selectively prevent rotation of the second race in either rotational direction depending on the position of the selector plate. The struts have a cylindrical portion and a pair of strut wings each having a free end. The strut wings connect to the cylindrical portion, and a different one of the free ends engages a strut pocket when an opposite strut wing is depressed in order to prevent rotation of the second race.

10 Claims, 4 Drawing Sheets

SELECTABLE ONE-WAY CLUTCH WITH SYMMETRICAL STRUTS

CLAIM OF PRIORITY

This application claims priority to U.S. Provisional Patent Application No. 60/884,700, filed on Jan. 12, 2007, which is hereby incorporated by reference in its entirety.

TECHNICAL FIELD

The present invention relates to a selectable one-way clutch having a plurality of torque-transmitting elements or struts each configured in a symmetrical manner for holding torque in either rotational direction.

BACKGROUND OF THE INVENTION

In various mechanical devices, and particularly within automatic vehicle transmissions, specialized overrunning or one-way clutching devices are used to produce a one-way driving connection between the respective input and output clutch races. Specifically, a one-way clutch is capable of transmitting torque when the rotation of one race with respect to the other race is in one direction, with the clutch "overrunning" or freewheeling when the rotational direction is reversed.

The relative shape and orientation of the input and output races may vary depending on the particular clutch design. Certain one-way clutches have input and output races that are oriented in a radially concentric manner with respect to each other. Alternately, the confronting or mating faces of the input and output races have a planar orientation or relationship. The mechanical means used to lock a typical one-way clutch are varied, but commonly consist of torque-transmitting elements such as rollers, sprags, rockers, or struts that are positioned between the input and output races. Depending on the particular type or style of one-way clutch and the direction of rotation, each race may contain unique surface features suitable for engaging one or more of the struts in order to selectively enable various clutch operating modes.

The operating modes of a basic one-way clutch include a "locked" mode in one rotational direction and a "freewheel" mode in the opposite rotational direction. In a basic one-way clutch, the operating mode is determined by the direction of the torque being applied to the input race. However, the increased complexity of power transmitting mechanisms has led to a class of selectable one-way clutches or SOWC. A SOWC is similar to a basic one-way clutch in operation as described above. However, as the name implies, SOWC are further capable of producing a driving connection between an input and output race in one or both rotational directions, and/or are also able to freewheel in one or both rotational directions as needed.

SUMMARY OF THE INVENTION

Accordingly, a selectable one-way clutch (SOWC) is provided for use with a vehicle transmission. The SOWC includes a first race having one or more strut pockets, and a second race. The SOWC also includes a selector plate defining one or more windows, a symmetrical strut that is selectively positionable within the strut pocket and adapted for preventing rotation of one of the first and second races, and at least one spring positioned between the strut and a surface of the first race for biasing the strut in an axial direction with respect to an axis of the first and second races.

In one aspect of the invention, the symmetrical struts each include a pair of strut wings each having a free end that is engageable to prevent rotation of a race in a different rotational direction.

In another aspect of the invention, the strut wings are connected to a cylindrical portion of the symmetrical strut, and the symmetrical strut rotates about an axis of the cylindrical portion in response to contact between the symmetrical strut and the selector plate.

In another aspect of the invention, each of the strut wings has a tapered profile adapted for reducing bending stresses exerted on the symmetrical strut.

In another aspect of the invention, the spring is a helical coil spring.

In another aspect of the invention, a selectable one-way clutch (SOWC) for use with a vehicle transmission includes a first and a second race, the first race having a strut pocket formed therein, and the second race having a strut notch formed therein. The SOWC also includes a selector plate having a solid blocking portion at least partially defining a window in a thickness of the selector plate, a symmetrical strut having a cylinder portion and a pair of strut wings extending radially therefrom in opposite directions, and a spring positioned between the cylinder portion and the first race for biasing the strut. Movement of the selector plate in one direction rotates the symmetrical strut with respect to an axis of the cylinder portion and depresses one of the strut wings into a strut pocket to prevent rotation of one of the races in one rotational direction, and movement of the selector plate in another direction depresses the other strut wing into the strut pocket for preventing rotation in another rotational direction.

In another aspect of the invention, a symmetrical strut is provided for use with a selectable one-way clutch (SOWC) having a first race and a second race. The strut has a cylindrical portion having an axis, and a plate that is connected to the cylindrical portion. The plate includes a first and a second strut wing each extending radially from the cylindrical portion, and each of the strut wings is selectively depressible by the selector plate for selecting between a plurality of operating modes of the SOWC.

In another aspect of the invention, the strut rotates in one direction with respect to the axis when the first strut wing is depressed by the selector plate, and in another direction with respect to the axis when the second strut wing is depressed by the selector plate.

In another aspect of the invention, depressing the first strut wings and not depressing the second strut wings enables a first operating mode, depressing the second strut wing and not depressing the first strut wing enables a second operating mode, and depressing both of the strut wings enables a third operating mode.

In another aspect of the invention, the first operating mode prevents rotation of a race in one rotational direction, the second operating mode prevents rotation of the race in the other rotational direction, and the third operating mode allows rotation of the race in either rotational direction.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
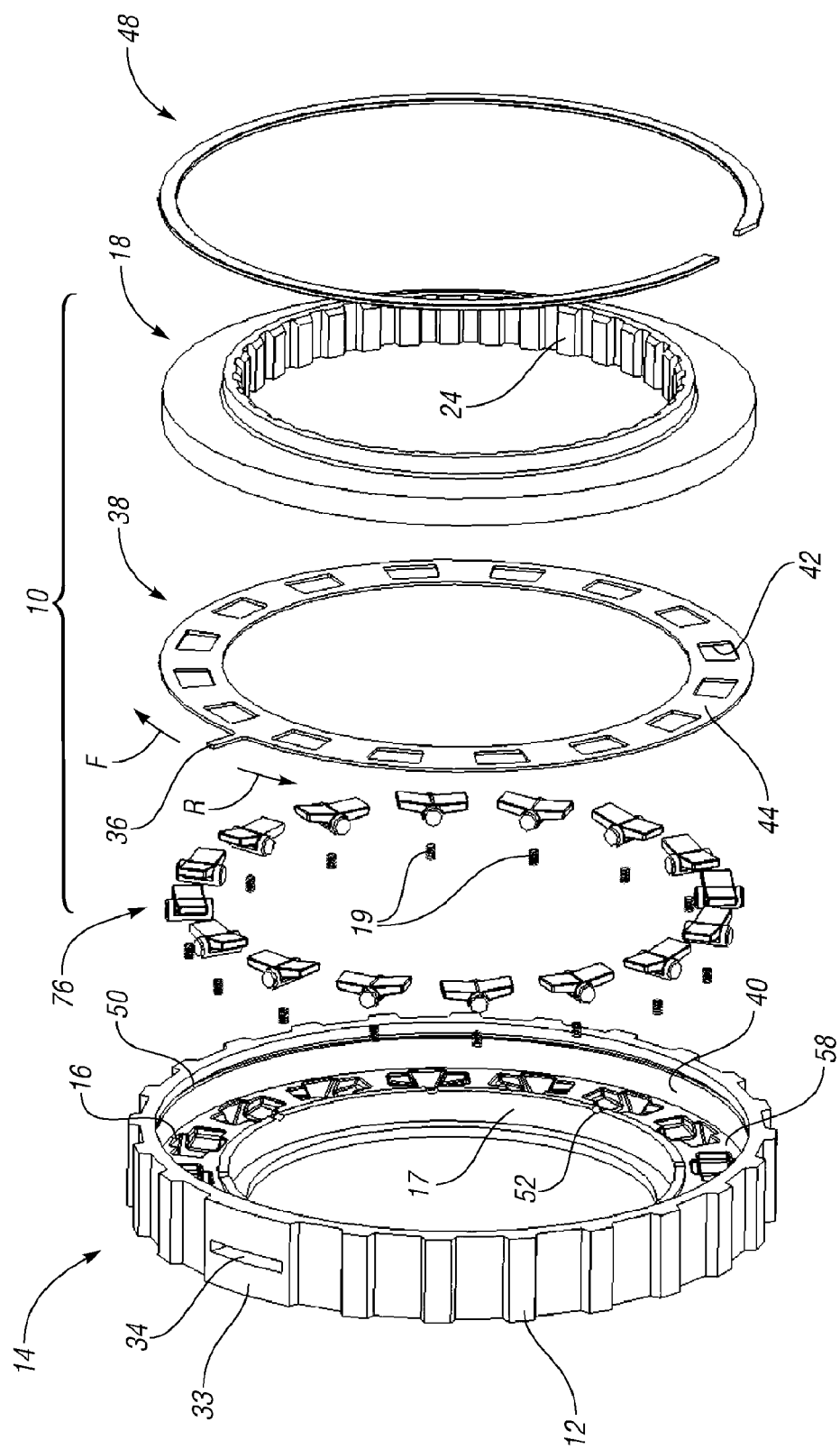
FIG. 1 is an exploded schematic perspective view of the selectable one-way clutch of FIG. 1.

With reference to the Figures, wherein like reference numerals refer to like or similar components throughout the several figures, and beginning with FIG. 1, a selectable one-way clutch (SOWC) 10 has a first race or pocket plate 14, a plurality of symmetrical torque-transmitting elements hereinafter referred to as struts 76, a blocking ring or a selector plate 38 for selectively positioning or orienting the struts 76, and a second race or a notch plate 18. The SOWC 10 may also include a retaining ring 48 for applying a suitable axial retaining force within the SOWC 10 for retaining the pocket plate 14 with respect to the notch plate 18. The SOWC 10 is operable for holding torque in either rotational directions, as well as for freewheeling in response to positioning or movement of the selector plate 38 within the SOWC 10, as described below.

Because the force that is transmitted between the pocket plate 14 and the notch plate 18 via a strut 76 during operation of the SOWC 10 includes both an axial as well as a radial component, the axial component exerts a separating force between the pocket plate 14 and the notch plate 18. The retaining ring 48 (see FIGS. 1-3) is therefore preferably installed in a retaining ring groove 50 provided within the pocket plate 14 to serve as the reaction member for this axial force. Additionally, during the freewheeling modes described later hereinbelow, the series of radial lubrication passages 52 (see FIGS. 1 and 3) in the pocket plate 14 provide damping to the struts 76 as the struts 76 rotate into and out of the mating strut notches 20 of the notch plate face 22, which will be described later hereinbelow. The radial lubrication passages 52 also lubricate and cool surfaces of the SOWC 10 moving relative to each other during the freewheeling modes. A similar arrangement of lubrication holes could also be incorporated into the notch plate 18 instead of the pocked plate 14 within the scope of the invention.

The pocket plate 14 has an internal bore 17, and is configured or equipped with a plurality of externally-projecting teeth or external splines 12 that are engageable or otherwise mateable with internal splines or teeth (not shown) of a stationary reaction member, such as an automobile transmission case. A radial slot 34 is formed through or within the pocket plate 14, such as within a sufficiently sized and configured external projection, tooth, or selector spline 33, in order to provide an opening suitable for moving a selector portion or lever 36 of the selector plate 38 in the directions indicated by the arrows F and R. The notch plate 18 is configured with a plurality of equally spaced, internally-projecting teeth or internal splines 24 that are drivingly engageable or mateable with opposing teeth or splines of a rotatable torque input device (not shown).

The pocket plate 14 has an internal wall or bore 40 and a circumferential retaining ring groove 50 adapted to hold or retain a thickness of the retaining ring 48, and also has a plurality of equally spaced strut wells or pockets 16 formed and/or positioned circumferentially around and along an internal face 58 of the pocket plate 14, the internal face 58 being positioned perpendicularly to the bore 40. Radial lubrication passages 52 may be formed through or otherwise provided within the internal bore 17 of the pocket plate 14 to deliver a supply of coolant/lubricant (not shown) into the SOWC 10 as needed.

Helical or coiled compression springs 19, hereinafter referred to simply as springs 19, are each contained in a recess, hole, or spring bore 64 (see FIGS. 5A-5D) provided within a corresponding strut pocket 16 of the pocket plate 14. Each of the springs 19 exerts a sufficient spring force on an opposing strut 76 to thereby actuate or move the strut 76 into engagement with the notch plate 18, as described later hereinbelow. While the springs 19 are used in one embodiment, an alternate energy storage device, such as an accordion compression spring (not shown), could also be employed in place of the helical compression configuration of the springs 19. However, if such an accordion compression spring were to be used, the shape of the spring bore 64 in the bottom of the strut pocket 16 would be formed with a rectangular profile instead of a round profile in order to best accommodate the shape of the compression spring, as will be understood by those of ordinary skill in the art.

Figure 2:
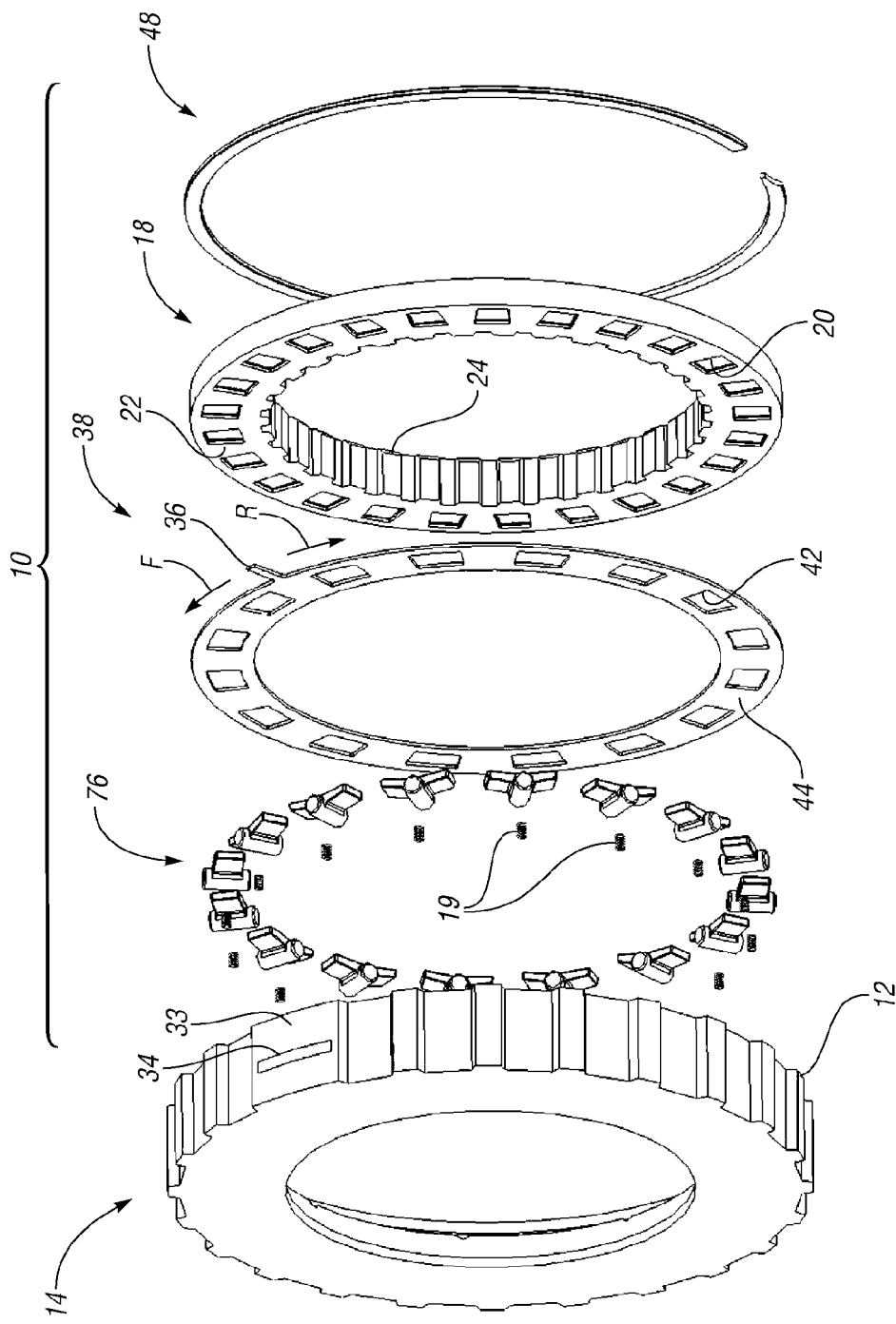
FIG. 2 is another exploded schematic perspective view of the selectable one-way clutch of FIGS. 1 and 2.

A selector plate 38 having a selector lever 36 and interspaced blocking portions 44 is positioned between the pocket plate 14 and the notch plate 18, and is positioned adjacent to the bore 40 and the face 58 of the pocket plate 14. A plurality of approximately equally sized and spaced windows 42 are formed or otherwise provided in the selector plate 38 and at least partially defined by the blocking portions 44 in a quantity equal to the number of strut pockets 16. Each window 42 is configured to allow a strut 76 to contact a particular portion of a notch plate face 22 shown in FIG. 2. As best shown in FIG. 2, the notch plate 18 further has a plurality of approximately equally spaced strut wells or strut notches 20 formed in the notch face 22, i.e. the side or face of the notch plate 18 that faces or confronts the pocket plate 14.

Figure 3:
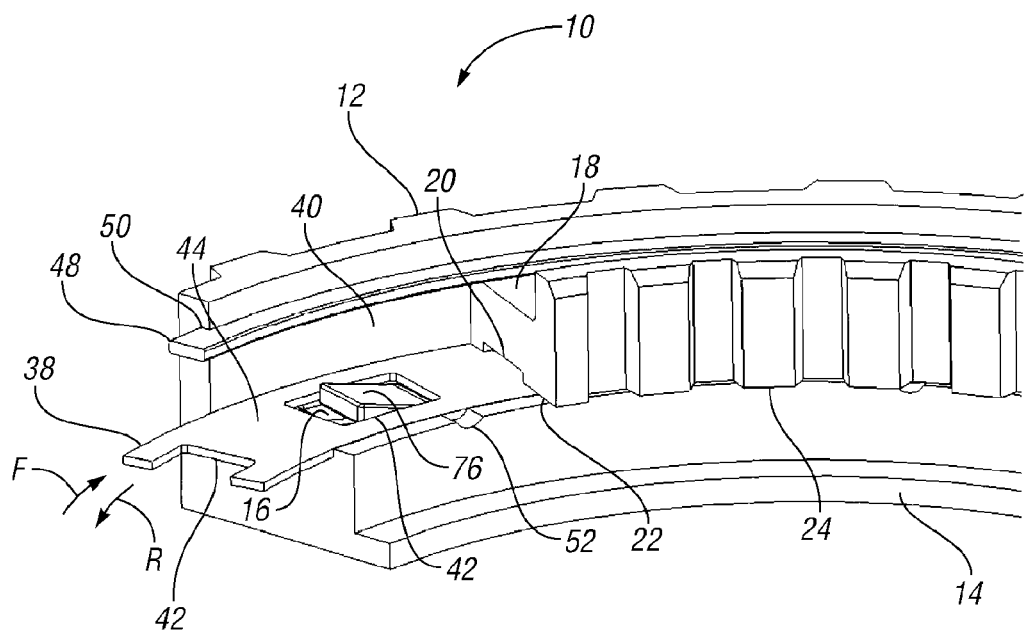
FIG. 3 is a schematic perspective cutaway view of the selectable one-way clutch of FIGS. 1, 2, and 3 showing an integrated forward/reverse strut in a forward locked position.

Referring to FIG. 3, the SOWC 10 is shown in perspective cutaway side view with the pocket plate 14 in mating engagement with the notch plate 18. Each strut pocket 16 in the pocket plate 14 contains a different strut 76 that is free to rock about its own axis 11 (see FIG. 4) within the strut pocket 16. Additionally, each strut 76 has the ability to move linearly along an axis of rotation of the SOWC 10 against the force of the springs 19 (see FIGS. 1 and 2). The selector plate 38 is positioned between the pocket plate 14 and the notch plate 18, and rotates along the bore 40 of the pocket plate 14. The selector plate 38 may be selectively positioned or moved with respect to the pocket plate 14, for example using an electric solenoid, a hydraulically-actuated device, or other such mechanism capable of exerting a force on the selector lever 36 (see FIG. 1) in the directions of arrows F and R.

Figure 4:
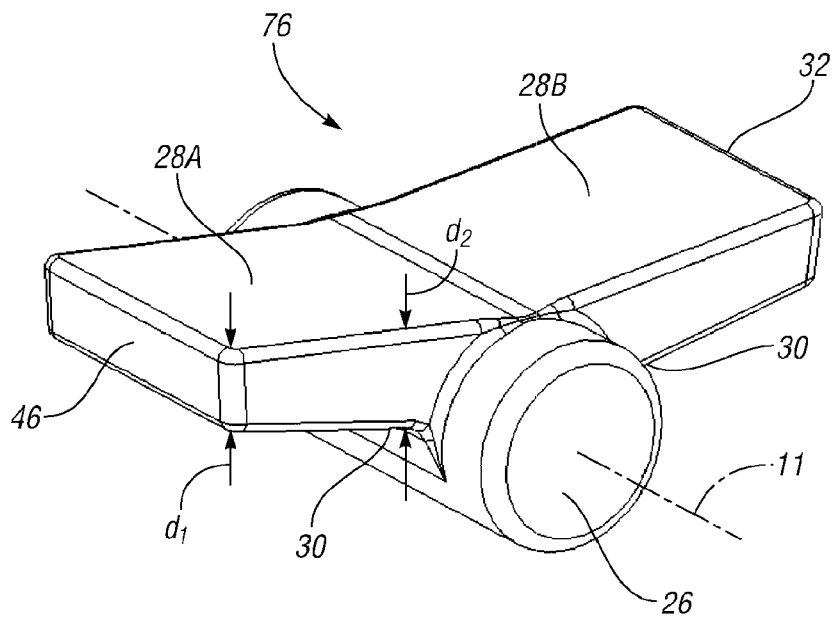
FIG. 4 is a schematic perspective view of a symmetrical strut according to the invention.

Referring to FIG. 4, a strut 76 of the invention is an integrated, unitary, and/or combined forward/reverse strut configuration that is symmetrically formed about its axis of rotation or axis 11, which may be shaped to form a cylinder 26 in the embodiment shown in FIG. 4 to thereby facilitate a rocking or rolling motion about the axis 11. The strut 76 includes a pair of substantially flat extensions or strut wings 28A, 28B each having a base 30. The strut wing 28A has a free end 46, and the strut wing 28B has a substantially similar free end 32, each of which extends radially from the cylinder 26. Each base 30 has a thickness $d_1$ that is greater than a thickness $d_2$ of either of the free ends 32 and 46 in order to form a tapered profile suitable for reducing or minimizing any bending stresses exerted on the strut 76 during operation of the SOWC 10 (see FIGS. 1 and 2). The symmetrically formed strut 76 is thus able to rotate or rock about its axis 11 within the strut pocket 16, and is also free to move linearly along the axis of rotation of the SOWC 10 against a force provided by the spring 19 (see FIGS. 2-3 and 5A-5D).

The free ends 32, 46 shown in FIG. 4 may be identically constructed to facilitate assembly of the SOWC 10 (see FIGS. 1 and 2), and act as a torque-holding face for a different rotational direction. To facilitate installation, the struts 76 may be installed into a strut pocket 16 in either direction. For illustrative purposes, the free end 32 is referred to hereinafter as the reverse end 32, with the reverse end 32 preventing rotation in a reverse direction, and the free end 46 is referred to hereinafter as the forward end 46, with the forward end 46 preventing rotation in a forward direction, however installation in the other direction would reverse the torque-holding orientation of the strut 76.

Figure 5A:
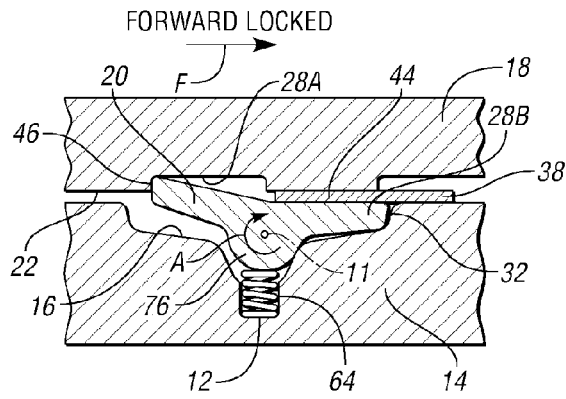
FIG. 5A is a fragmentary schematic side view of the selectable one-way clutch of the invention having an integrated forward/reverse strut in the forward locked position.

Referring to FIG. 5A, the "forward locked" position is shown with the notch plate 18 locked or prevented from rotating in the direction of arrow F by the position of the forward end 46 of a strut 76. The reverse end 32 is positioned within a strut pocket 16 above a spring 19. The selector plate 38 is then actuated or moved in the direction of arrow F to allow the selector lever 36 (see FIGS. 1 and 2) to "tip" or depress the strut wing 28B into the strut pocket 16, thus causing the forward end 46 to rise into engagement with the strut notch 20 of the notch plate 18. In the configuration of FIG. 5A, the blocking portion 44 of the selector plate 38 depresses the strut wing 28B so that the strut 76 rotates or rocks about its axis 11 in the direction of arrow A, thus allowing the notch plate 18 to rotate in the direction of arrow R as will now be described with reference to FIG. 5B.

Figure 5B:
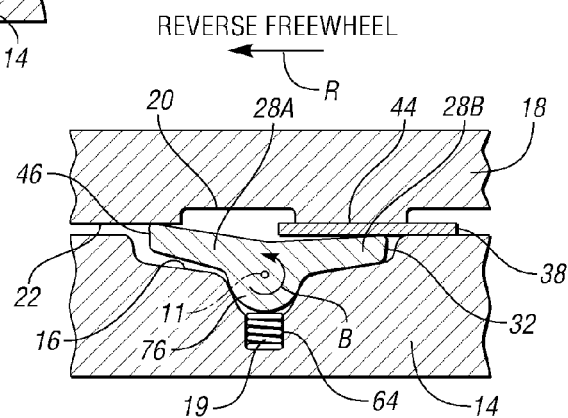
FIG. 5B is a fragmentary schematic side view of the selectable one-way clutch of the invention having an integrated forward/reverse strut in the forward freewheel position.

Referring to FIG. 5B, a "reverse freewheel" position is shown, with the notch plate 18 now rotating in the reverse direction, as represented by the arrow R. When torque acting on the notch plate 18 is reversed from the position shown in FIG. 5A and described above, the strut 76 is free to rotate or rock about its axis 11 in the direction of arrow B, with the notch plate 18 depressing the strut wing 28A. In this manner, the notch plate 18 is allowed to rotate or freewheel in the direction represented by the arrow R. When this occurs, the spring 19 exerts a moment of force on the strut 76, which urges the forward end 46 that is aligned with radial window 42 into contact with the notch plate face 22.

Figure 5C:
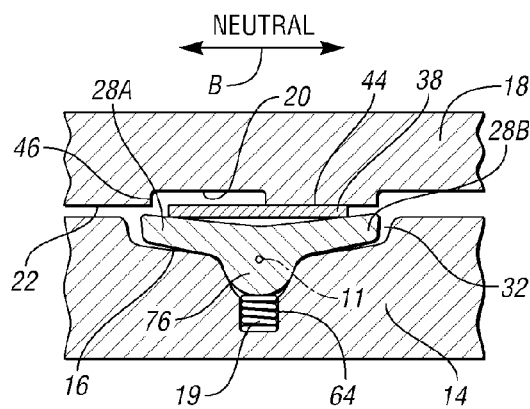
FIG. 5C is a fragmentary schematic side view of the selectable one-way clutch of the invention having an integrated forward/reverse strut in the neutral position.

Referring to FIG. 5C, which shows a "neutral" position, i.e. a position in which neither the reverse end 32 or the forward end 46 of the strut 76 are oriented to engage a strut notch 20 in the notch plate 18. Moving the selector lever 36 (see FIGS. 1 and 2) to the middle of the radial slot 34 in the pocket plate 14 moves the blocking portion 44 to depress both strut wings 28A, 28B of the strut 76. The strut 76 rotates to a position at which both the reverse end 32 and the forward end 46 are equidistant from the notch plate face 22. When positioned in this manner, force is not transmitted between the pocket plate 14 and the notch plate 18, and the notch plate 18 is therefore allowed to freely rotate in either rotational direction, as represented by the double arrow B.

Figure 5D:
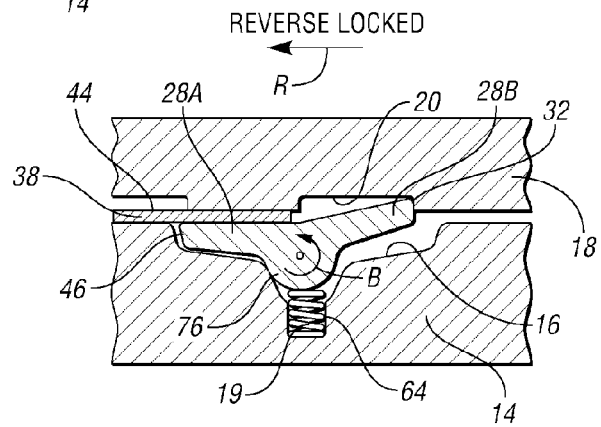
FIG. 5D is a fragmentary schematic side view of the selectable one-way clutch of the invention having an integrated forward/reverse strut in the reverse locked position.

Referring to FIG. 5D, which shows a "reverse locked" position wherein the notch plate 18 is locked or prevented from rotating in the direction of arrow R. The forward end 46 of the strut 76 is prevented or blocked from contacting the notch plate face 22 by the blocking portion 44. Simultaneously, a window 42 of the selector plate 38 aligns with a reverse end 32 of the strut 76. The reverse end 32 is rotated into contact with the notch plate face 22 by the force of the spring 19 positioned below the strut 76. As described hereinabove with reference to FIG. 5A for the forward direction of rotation, depending on the number of strut notches 20 used in the notch plate 18 and the number of struts 76, a reverse end 32 of one or more of the struts 76 will be sufficiently positioned to engage a strut notch 20 in the notch plate 18. At least one strut 76 will then engage a strut notch 20 in the notch plate 18, thereby enabling a force to be transmitted between the pocket plate 14 and the notch plate 18.

While the best modes for carrying out the invention have been described in detail, those familiar with the art to which this invention relates will recognize various alternative designs and embodiments for practicing the invention within the scope of the appended claims.

The invention claimed is:

1. A selectable one-way clutch (SOWC) for use with a vehicle transmission, the SOWC comprising:
    a first race and a second race, wherein said first race has at least one strut pocket formed therein defining a spring bore;
    a selector plate defining interspaced blocking portions, wherein each of said interspaced blocking portions at least partially defines a window;
    at least one symmetrical strut that is selectively positionable within said at least one strut pocket adjacent to said spring bore, and configured for engaging said second race through said window for preventing rotation of said second race in either rotational direction; and
    at least one spring that is positioned in said spring bore adjacent to said at least one strut and configured for biasing said at least one strut toward said second race.

2. The SOWC of claim 1, wherein said at least one symmetrical strut includes a plate portion defining a pair of strut wings each having a free end adapted for selectively preventing rotation of said second race in a different one of said either rotational direction.

3. The SOWC of claim 2, wherein said plate portion is operatively connected to a cylindrical portion, and wherein said at least one symmetrical strut is operable for rotating about said axis in response to contact between one of said strut wings and said selector plate.

4. The SOWC of claim 1, wherein said plate portion has a tapered profile adapted for reducing bending stresses exerted on said at least one symmetrical strut.

5. The SOWC of claim 1, wherein said at least one spring is a helical coil spring.

6. A selectable one-way clutch (SOWC) for use with a vehicle transmission comprising:
    a first race and a second race, wherein said first race has a strut pocket formed therein which defines a spring bore, and wherein said second race has a strut notch formed therein;
    a selector plate having a solid blocking portion at least partially defining a window in a thickness of said selector plate;
    a symmetrical strut positioned at least partially within said strut pocket, said symmetrical strut having a cylinder portion with an axis and a pair of strut wings extending radially outward from said cylinder portion; and a spring positioned within said spring bore between said cylinder portion of said strut and said first race for biasing said strut;

wherein movement of said selector plate in one direction rotates said strut with respect to said axis and depresses one of said pair of strut wings into said strut pocket via contact with the solid blocking portion for preventing rotation of said second race in one rotational direction, and wherein movement of said selector plate in another direction rotates said strut with respect to said axis and depresses the other one of said pair of strut wings into said strut pocket via contact with the solid blocking portion for preventing rotation of said second race in another rotational direction.

7. The SOWC of claim 6, wherein each of said pair of strut wings has a free end that is configured for preventing said rotation by engaging said strut pocket.

8. The SOWC of claim 6, wherein each of said pair of strut wings has a tapered profile configured for reducing bending stresses exerted on said at least one strut.

9. The SOWC of claim 6, wherein said spring is a helical coil spring.

10. The SOWC of claim 6, further comprising a retaining ring within a groove of said second race;

wherein said retaining ring is configured as a reaction member for reacting an axial force transmitted between said second race and said first race to thereby minimize an axial separation between said second and said first race.

\* \* \* \* \*